(12) United States Patent
Chang

(10) Patent No.: US 6,886,853 B2
(45) Date of Patent: May 3, 2005

(54) AIR BAG SYSTEM FOR PROTECTING THE KNEES OF A DRIVER

(75) Inventor: Hong-Sik Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 10/322,162

(22) Filed: Dec. 17, 2002

(65) Prior Publication Data

US 2003/0111830 A1 Jun. 19, 2003

(30) Foreign Application Priority Data

Dec. 19, 2001 (KR) .......................... 2001-81096

(51) Int. Cl.⁷ .............................................. B60R 21/22
(52) U.S. Cl. .................................. 280/730.1; 280/732
(58) Field of Search .......................... 280/730.1, 732, 280/728.3, 728.2, 753, 750, 752

(56) References Cited

U.S. PATENT DOCUMENTS

| | | | |
|---|---|---|---|
| 4,360,223 A | 11/1982 | Kirchoff | |
| 5,458,366 A | 10/1995 | Hock et al. | |
| 5,492,367 A | 2/1996 | Albright et al. | |
| 5,536,043 A | 7/1996 | Lang et al. | |
| 5,570,901 A | * 11/1996 | Fyrainer | 280/730.1 |
| 5,775,729 A | 7/1998 | Schneider et al. | |
| 5,816,613 A | * 10/1998 | Specht et al. | 280/730.1 |
| 6,092,836 A | 7/2000 | Saslecov | |
| 6,186,542 B1 | 2/2001 | Enders et al. | |
| 6,217,059 B1 | 4/2001 | Brown et al. | |
| 6,302,437 B1 | * 10/2001 | Marriott et al. | 280/732 |
| 6,435,554 B1 | * 8/2002 | Feldman | 280/730.1 |
| 6,517,103 B1 | * 2/2003 | Schneider | 280/730.1 |

FOREIGN PATENT DOCUMENTS

| | | |
|---|---|---|
| EP | 0 684 164 | 12/1998 |
| EP | 0 891 901 | 1/1999 |
| JP | 06-262999 | 9/1994 |
| WO | WO 97/09207 | 3/1997 |
| WO | WO 98/45144 | 10/1998 |
| WO | WO 00/32447 | 6/2000 |
| WO | WO 02/04261 | 1/2002 |

* cited by examiner

Primary Examiner—Peter C. English
(74) Attorney, Agent, or Firm—Morgan Lewis & Bockius LLP

(57) ABSTRACT

The present invention provides an air bag system for protecting the knees of a driver. The air bag is disposed between a lower crash pad and a shroud panel and is expanded during an accident. The air bag is capable of absorbing impact force and occupies minimal space in the interior of a vehicle, thereby providing protection for the knees and shins of a driver during a head-on collision or an offset collision.

4 Claims, 3 Drawing Sheets

AIR BAG SYSTEM FOR PROTECTING THE KNEES OF A DRIVER

FILED OF THE INVENTION

Generally, the present invention relates to an air bag system. More particularly, the present invention relates to an air bag system for protecting the knees of a driver from articles such as the steering column and the like in the event of a head-on or offset collision.

BACKGROUND OF THE INVENTION

In general, an air bag system serves to reduce injury to occupants of a vehicle by inflating a bag, toward the occupants, in the event of a head-on collision or offset collision. Typically, air bags are disposed inside a steering wheel or a dash panel for protecting the head and chest region of the occupants of vehicles.

Typical devices used for protecting the driver lower extremities, such as the knees, include knee protection brackets mounted on a lower crash pad on the driver's side. However, a drawback of this configuration is that the driver's knees are protected only in a head-on collision and not in offset collisions. Typically, in offset collisions the drivers knees often hit a shroud panel encompassing the steering column because the knees often move in the lateral direction. When the driver's knees hit the shroud panel, the knees are often injured because the shroud panel minimally absorbs the force of an impact. A further drawback of the typical shroud panel knee protection device is that the shroud panel often interferes with the drivers knees upon entering and exiting the vehicle under normal conditions.

SUMMARY OF THE INVENTION

The present invention provides an air bag system adapted to protect the knees of a driver from rigid articles, such as, a steering column and the like, in the event of a head-on or an off-set collision.

In accordance with an embodiment of the present invention, an air bag system for protecting the driver's knees comprises an air bag secured at a lower end with an inner surface of a lower crash pad and further secured at an upper end with an inner surface of a shroud panel. Further included is an inflator unit connected to the air bag for inflating the air bag in response to a control signal. Also, an air bag cover is mounted at an inner surface of the lower crash pad for preventing destruction of the air bag.

BRIEF DESCRIPTION OF THE DRAWINGS

For a fuller understanding of the nature and objects of the present invention, reference should be made to the following detailed description taken in conjunction with the accompanying drawings in which.

DETAILED DESCRIPTION OF THE INVENTION

Figure 1:
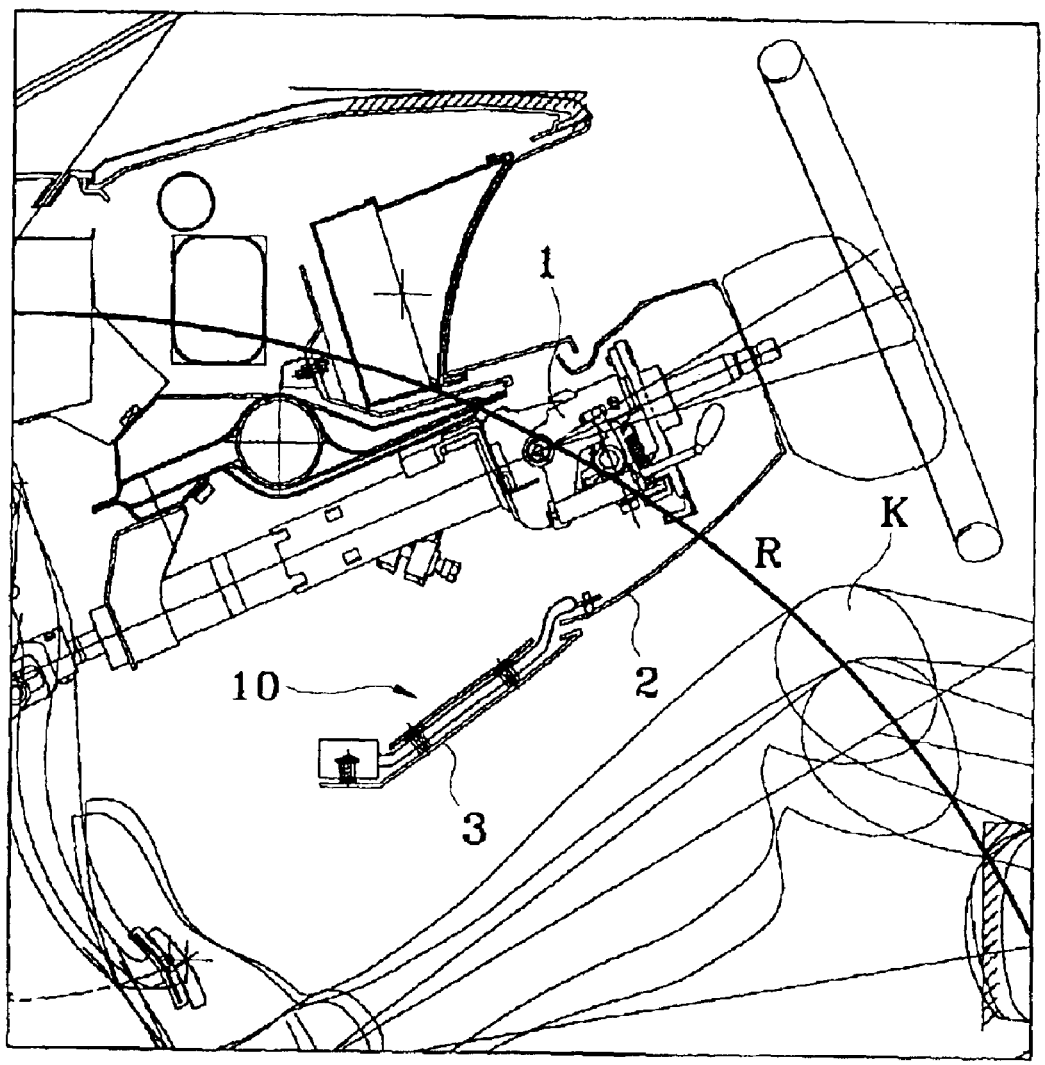
FIG. 1 is a longitudinal cross-sectional view illustrating an air bag system for protecting the knees of a driver according to an embodiment of the present invention.
Figure 2:
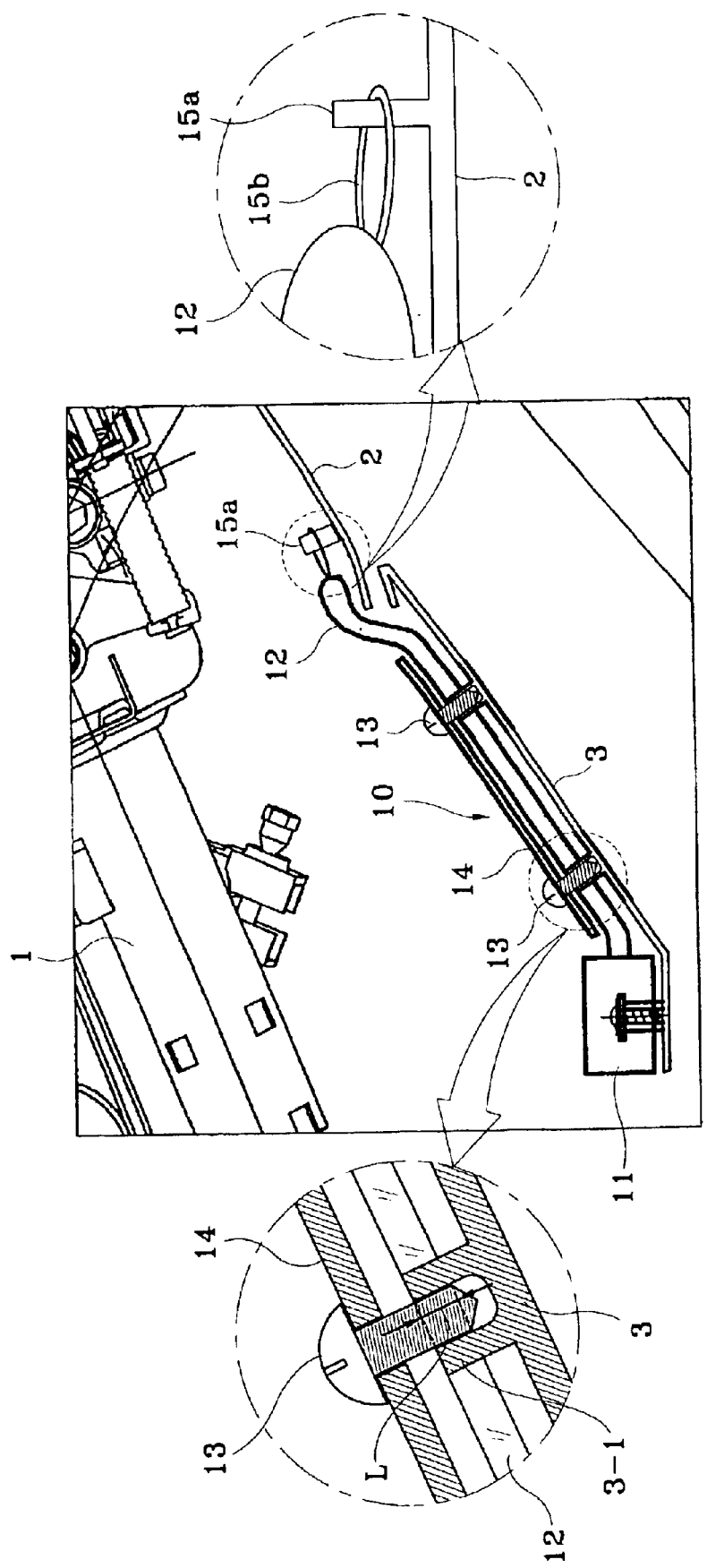
FIG. 2 is a detailed drawing illustrating the principal parts of FIG. 1.
Figure 3:
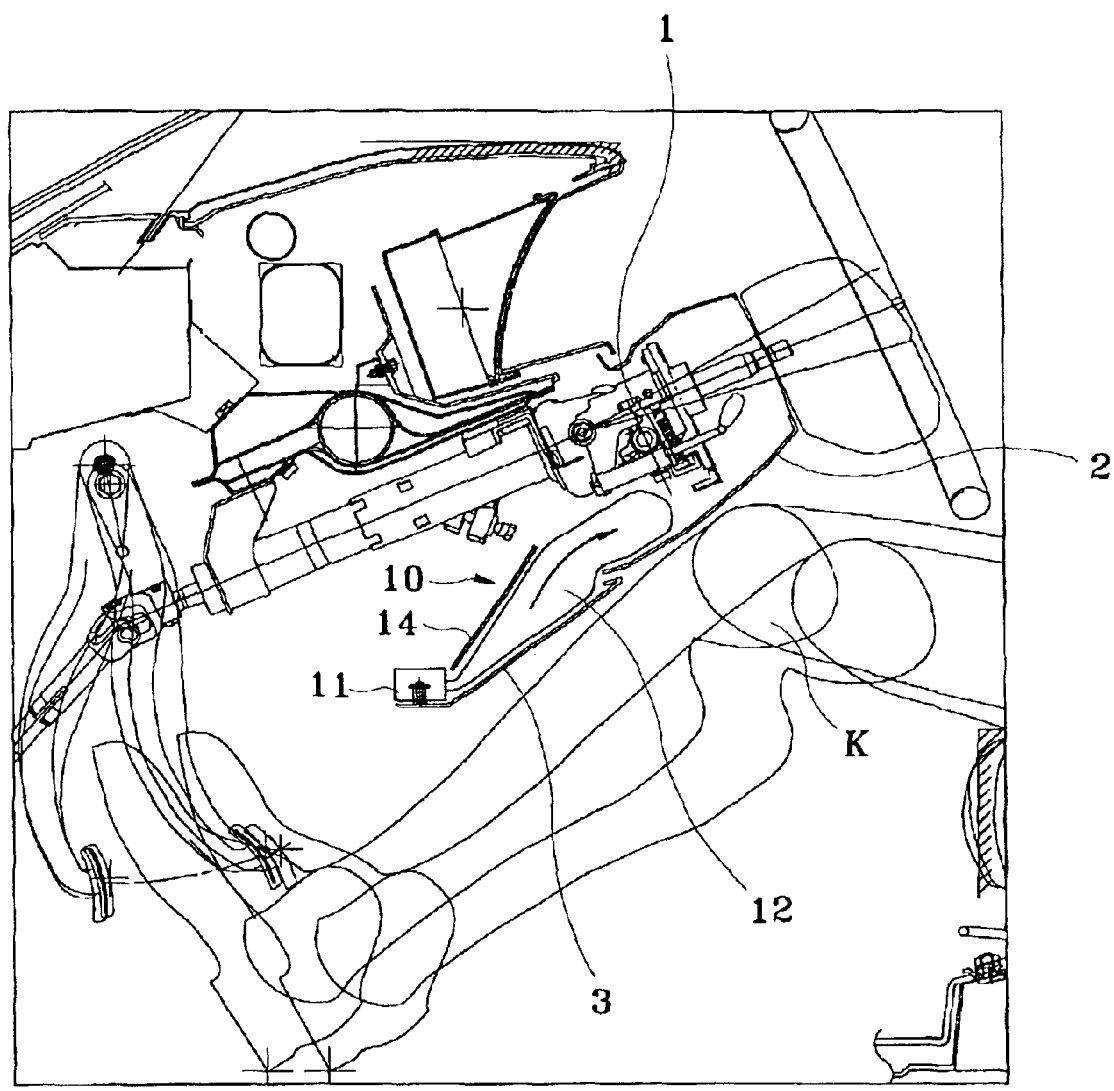
FIG. 3 is an operational state drawing of an air bag system for protecting the knees of a driver according to an embodiment of the present invention.

Referring to FIGS. 1 and 2, a lower crash pad 3 and shroud panel 2 are included in the drivers knee region R of a vehicle. An air bag system 10 includes an air bag 12 that is preferably connected to an inflator unit 11 that inflates the air bag 12 in response to a control signal sent from an air bag control unit (not shown) in an embodiment of the invention. The inflator unit 11 is mounted at the inner surface of the lower crash pad 3 and is connected to the lower portion of the air bag 12. In an embodiment the lower portion of the air bag 12 is secured to the inner surface of the lower crash pad 3 while the upper portion thereof is connected thereon to the inner surface of the shroud panel 2.

A ring 15b (FIG. 2) is provided at the upper end of the air bag 12 for hitching and fixing the upper end of the air bag 12 to a hitching protrusion 15a. The hitching protrusion 15a is formed at an inner surface of the shroud panel 2. In use, the purpose of the ring 15b is to make it easy for the upper end of the air bag 12 to be secured at the shroud panel 2 when the air bag 12 is mounted. Furthermore, this also helps ensure proper expansion of the upper end of the air bag 12 into the shroud panel 2 when the air bag 12 is inflated.

In a preferred embodiment, an air bag cover 14 is installed at a lateral surface of the air bag 12 facing the steering column 1. The air bag cover 14 is mounted at an inner lateral surface of the lower crash pad 3 for encompassing the air bag 12. Thus, when the air bag 12 is inflated, the air bag 12 is protected from being destroyed by the components of the steering column 1 and other peripheral parts of the region of the driver's knees.

The air bag cover 14 is secured to the lower crash pad 3. In a preferred embodiment the force generated by the inflation of the air bag 12 is greater than the strength of the air bag cover 14 securing structure. In an embodiment of the invention the securing structure for the air bag cover 14 is a threaded protrusion L disposed on screw 13 which passes through the air bag cover 14 and couples into a boss 3-1. The boss 3-1 is formed with the lower crash pad 3. In use, the coupling between the screw 13 and the boss 3-1 breaks away when the air bag 12 is inflated.

In another embodiment, a notch is formed in the boss 3-1 or in the screw 13 to facilitate shearing of the structure in response to the force of the air bag 12 inflating.

Hereinafter, the operation of the present invention thus constructed will be described.

In the event of a head-on collision or an offset collision, an impact sensor (not shown), mounted on the vehicle, detects the impact and sends a signal to the air bag control unit (not shown). The air bag control unit (not shown) analyzes the signal transmitted from the impact sensor and determines whether the impact force is strong enough to cause injury to the occupants.

When the air bag control unit (not shown) determines that the impact force is strong enough to harm the passengers, the air bag control unit activates the traditional vehicle air bag systems disposed inside the steering wheel and dash, and simultaneously activates the inflator unit 11 mounted at the inner side of the lower crash pad 3 for activating the air bag 12. As a result, the air bag 12 is expanded. The upper side of the air bag 12 expands and thereby fills out the inner side of the shroud panel 2.

In a preferred embodiment, the ring 15b detaches from the hitching protrusion 15a in response to expansion of the air bag 12, such that the ring 15b and the hitching protrusion 15a do not interfere with the expansion of the air bag 12. Also, in a preferred embodiment, the expansion force of the air bag 12 during inflation destroys a portion of the coupling between the screw 13 and the boss 3-1 . This allows a sufficient amount of space for the air bag 12 to inflate within the region between the air bag cover 14 and the lower crash pad 3.

In use, when human body parts, such as the driver's knees K and the like, come in contact with the lower crash pad 3 or the shroud panel 2 in a head-on or off-set collision, while the air bag 12 is expanded, the impact force is absorbed by the air bag 12.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described above in order to best explain the principles of the invention and its practical applications, to thereby enable others skilled in the art to best utilize the invention and various embodiments with various modifications as are suited to the particular use contemplated. The present disclosure is therefore to be considered in all respects illustrative and not restrictive, the scope of the invention being indicated by the appended claims, and all changes that come within the range and meaning of equivalency are intended to be embraced therein.

What is claimed is:

1. An air bag system for protecting the knees of a driver, comprising:

an air bag secured at a lower end thereof to an inner surface of a lower crash pad and secured at an upper end thereof to an inner surface of a shroud panel;

an inflator unit connected to said air bag for inflating said air bag in response to a control signal; and an air bag cover mounted on an inner surface of the lower crash pad for preventing destruction of said air bag during inflation.

2. The system of claim 1, further comprising:

a ring mounted at the upper end of the air bag; and, a hitching protrusion provided on the inner surface of the shroud panel wherein said ring is hitched to said hitching protrusion.

3. The system as defined in claim 1, wherein the inflator unit is disposed on the inner surface of said lower crash pad.

4. The system as defined in claim 1, wherein the air bag cover is installed on said lower crash pad by a fixing means for securing said air bag to said lower crash pad with a securing force smaller than an expansion force of said air bag generated when said air bag is expanded by said inflator unit.

* * * * *